(12) United States Patent
Ge et al.

(10) Patent No.: US 10,560,644 B2
(45) Date of Patent: Feb. 11, 2020

(54) IMAGE PROCESSING METHOD AND APPARATUS

(71) Applicant: Huawei Technologies Co., Ltd., Shenzhen (CN)

(72) Inventors: Fangyong Ge, Beijing (CN); Yali Wang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 200 days.

(21) Appl. No.: 15/511,583

(22) PCT Filed: Sep. 16, 2014

(86) PCT No.: PCT/CN2014/086624
§ 371 (c)(1),
(2) Date: Mar. 15, 2017

(87) PCT Pub. No.: WO2016/041144
PCT Pub. Date: Mar. 24, 2016

(65) Prior Publication Data
US 2017/0289466 A1    Oct. 5, 2017

(51) Int. Cl.
| | |
|---|---|
| *H04N 5/33* | (2006.01) |
| *H04N 5/232* | (2006.01) |
| *H04N 9/73* | (2006.01) |
| *G06T 5/50* | (2006.01) |
| *H04N 5/235* | (2006.01) |

(52) U.S. Cl.
CPC ......... *H04N 5/332* (2013.01); *H04N 5/23229* (2013.01); *H04N 9/73* (2013.01); *G06T 5/50* (2013.01); *H04N 5/235* (2013.01)

(58) Field of Classification Search
CPC .... H04N 5/332; H04N 5/23229; H04N 5/235; H04N 9/73; G06T 5/50
USPC .......................................................... 348/33
See application file for complete search history.

(56) References Cited

U.S. PATENT DOCUMENTS

| | | | |
|---|---|---|---|
| 6,825,470 B1 | 11/2004 | Bawolek et al. | |
| 7,737,394 B2 * | 6/2010 | Ovsiannikov | G03B 13/02 250/226 |
| 2003/0201990 A1 | 10/2003 | Aldrich et al. | |
| 2005/0174442 A1 | 8/2005 | Yuyama | |
| 2006/0261280 A1 | 11/2006 | Oon et al. | |

(Continued)

FOREIGN PATENT DOCUMENTS

| | | |
|---|---|---|
| CN | 1310915 A | 8/2001 |
| CN | 1662943 A | 8/2005 |

(Continued)

*Primary Examiner* — Mohammed S Rahaman
*Assistant Examiner* — Jimmy S Lee
(74) *Attorney, Agent, or Firm* — Leydig, Voit & Mayer, Ltd.

(57) ABSTRACT

An image processing method, including: obtaining image data of a photographed original image, and obtaining ambient infrared intensity I that is used when the original image is photographed; obtaining infrared image data corresponding to I according to a preset correspondence between tested infrared intensity and infrared image data; obtaining corrected image data according to the image data of the original image and the infrared image data corresponding to I; and obtaining a corresponding corrected image according to the corrected image data, and outputting the corrected image.

14 Claims, 4 Drawing Sheets

(56) References Cited

U.S. PATENT DOCUMENTS

| | | | |
|---|---|---|---|
| 2008/0006772 A1* | 1/2008 | Bume | G01J 5/08 |
| | | | 250/330 |
| 2008/0049115 A1 | 2/2008 | Ohyama et al. | |
| 2008/0062123 A1* | 3/2008 | Bell | G06F 3/011 |
| | | | 345/156 |
| 2008/0088826 A1 | 4/2008 | Ohyama et al. | |
| 2008/0239087 A1* | 10/2008 | Numazaki | H04N 5/2256 |
| | | | 348/222.1 |
| 2008/0246950 A1 | 10/2008 | Ono | |
| 2012/0001072 A1 | 1/2012 | Toda et al. | |
| 2012/0026357 A1* | 2/2012 | Katagairi | H04N 5/33 |
| | | | 348/223.1 |
| 2013/0093929 A1 | 4/2013 | Kouyama et al. | |
| 2013/0120583 A1 | 5/2013 | Dohi | |
| 2013/0188057 A1 | 7/2013 | Lin | |
| 2013/0318458 A1 | 11/2013 | Lyons et al. | |

FOREIGN PATENT DOCUMENTS

| | | | |
|---|---|---|---|
| CN | 1678082 A | 10/2005 | |
| CN | 1988628 A | 6/2007 | |
| CN | 102665083 A | 9/2012 | |
| CN | 102722864 A | 10/2012 | |
| CN | 103220534 A | 7/2013 | |
| CN | 103959224 A | 7/2014 | |
| CN | 104113743 A | 10/2014 | |
| CN | 104113744 A | 10/2014 | |
| JP | 2008099039 A | 4/2008 | |
| JP | 2008275582 A | 11/2008 | |
| JP | 2012003201 A | 1/2012 | |

* cited by examiner

IMAGE PROCESSING METHOD AND APPARATUS

CROSS-REFERENCE TO RELATED APPLICATIONS

This application is a national stage of International Application No. PCT/CN2014/086624, filed on Sep. 16, 2014, which is hereby incorporated by reference in its entirety.

TECHNICAL FIELD

The present invention relates to the field of image processing technologies, and in particular, to an image processing method and apparatus.

BACKGROUND

When taking a photo, a user wants to obtain an image with uniform color and brightness. However, in most cases, due to impact of an infrared ray, an imaging effect of an image photographed by a camera is relatively poor. Generally, both color and brightness of the image are not uniform, and as for the brightness, generally, the middle of the image is bright and surroundings of the image are dark.

In the prior art, to eliminate the impact of an infrared ray on the photographed image, a light filter, for example, an infrared filter or blue glass, is mounted onto a lens. This may reduce the impact of an infrared ray on the image to some extent. However, because of multiple times of reflection of an infrared ray between a light filter and a lens group, final image quality is affected to some extent, causing the image to be excessively brown or green, and the color to be not uniform. In fact, impact of an infrared ray on image quality still cannot be eliminated.

SUMMARY

To resolve a problem in the prior art that impact of an infrared ray on image quality is relatively significant, embodiments of the present invention provide an image processing method, in which an image with uniform brightness may be achieved if there is an infrared ray during photographing. The embodiments of the present invention further provide a corresponding apparatus.

According to a first aspect of the present invention, an image processing method is provided, including:

obtaining image data of a photographed original image, and obtaining ambient infrared intensity I that is used when the original image is photographed;

obtaining infrared image data corresponding to I according to a preset correspondence between tested infrared intensity and infrared image data;

obtaining corrected image data according to the image data of the original image and the infrared image data corresponding to I; and obtaining a corresponding corrected image according to the corrected image data, and outputting the corrected image.

With reference to the first aspect, in a first possible implementation manner, the correspondence is a relationship set including n groups of tested infrared intensity Ix and infrared image data Mx; the infrared image data Mx is infrared image data obtained when the tested infrared intensity Ix participates in imaging, where a value of x is 1, 2, . . . , n−1, n, and n is a positive integer greater than 1;

the obtaining infrared image data corresponding to I according to a preset correspondence between tested infrared intensity and infrared image data includes:

determining, from the correspondence, that I is between $I_m$ and $I_{m+1}$, where m is a positive integer less than n; and determining, according to a preset selection policy, $M_m$ corresponding to $I_m$ or $M_{m+1}$ corresponding to $I_{m+1}$ as the infrared image data corresponding to I.

With reference to the first possible implementation manner of the first aspect, in a second possible implementation manner, the determining, according to a preset selection policy, Mm corresponding to Im or Mm+1 corresponding to Im+1 as the infrared image data corresponding to I includes:

determining, according to a preset policy of selecting a lower limit, $M_m$ corresponding to $I_m$ as the infrared image data corresponding to I.

With reference to the first possible implementation manner of the first aspect, in a third possible implementation manner, the determining, according to a preset selection policy, Mm corresponding to Im or Mm+1 corresponding to Im+1 as the infrared image data corresponding to I includes:

according to a proximity selection policy, determining $M_m$ corresponding to $I_m$ as the infrared image data corresponding to I if a difference between I and $I_m$ is less than or equal to a difference between $I_{m+1}$ and I; or determining $M_{m+1}$ corresponding to $I_{m+1}$ as the infrared image data corresponding to I if a difference between I and $I_m$ is greater than a difference between $I_{m+1}$ and I.

With reference to the first aspect or any one of the first to the third possible implementation manners of the first aspect, in a fourth possible implementation manner, the obtaining corrected image data according to the image data of the original image and the infrared image data corresponding to I includes:

obtaining the corrected image data by subtracting the infrared image data corresponding to I from the image data of the original image.

With reference to the first aspect or any one of the first to the third possible implementation manners of the first aspect, in a fifth possible implementation manner, after the obtaining a corresponding corrected image according to the corrected image data, the method further includes:

performing white balance processing on the corrected image, where the white balance means that a proportion of three primary colors is adjusted in different color temperature environments to achieve color balance.

According to a second aspect of the present invention, an image processing apparatus is provided, including:

an obtaining unit, configured to obtain image data of a photographed original image, and obtain ambient infrared intensity I that is used when the original image is photographed;

a determining unit, configured to obtain, according to a preset correspondence between tested infrared intensity and infrared image data, infrared image data corresponding to I that is obtained by the obtaining unit;

a computation unit, configured to obtain corrected image data according to the image data of the original image obtained by the obtaining unit and the infrared image data corresponding to I obtained by the determining unit;

a corrected image obtaining unit, configured to obtain a corresponding corrected image according to the corrected image data obtained by the computation unit; and an output unit, configured to output the corrected image obtained by the corrected image obtaining unit.

With reference to the second aspect, in a first possible implementation manner, the determining unit includes:

a first determining module, configured to determine, from the correspondence, that I is between $I_m$ and $I_{m+1}$, where the correspondence is a relationship set including n groups of tested infrared intensity $I_x$ and infrared image data $M_x$; the infrared image data $M_x$ is infrared image data obtained when the tested infrared intensity $I_x$ participates in imaging, a value of x is 1, 2, ..., n−1, n, and n is a positive integer greater than 1; and m is a positive integer less than n; and a second determining module, configured to determine, according to a preset selection policy, $M_m$ corresponding to $I_m$ or $M_{m+1}$ corresponding to $I_{m+1}$ as the infrared image data corresponding to I, where $I_m$ and $I_{m+1}$ are determined by the first determining module.

With reference to the first possible implementation manner of the second aspect, in a second possible implementation manner, the second determining module is specifically configured to determine, according to a preset policy of selecting a lower limit, $M_m$ corresponding to $I_m$ as the infrared image data corresponding to I.

With reference to the first possible implementation manner of the second aspect, in a third possible implementation manner, the second determining module is specifically configured to: according to a proximity selection policy, determine $M_m$ corresponding to $I_m$ as the infrared image data corresponding to I if a difference between I and $I_m$ is less than or equal to a difference between $I_{m+1}$ and I; or determine $M_{m+1}$ corresponding to $I_{m+1}$ as the infrared image data corresponding to I if a difference between I and $I_m$ is greater than a difference between $I_{m+1}$ and I.

With reference to the second aspect or any one of the first to the third possible implementation manners of the second aspect, in a fourth possible implementation manner, the computation unit is specifically configured to obtain the corrected image data by subtracting the infrared image data corresponding to I from the image data of the original image.

With reference to the second aspect or any one of the first to the third possible implementation manners of the second aspect, in a fifth possible implementation manner, the apparatus further includes:

a processing unit, configured to perform white balance processing on the corrected image obtained by the corrected image obtaining unit, where the white balance means that a proportion of three primary colors is adjusted in different color temperature environments to achieve color balance.

According to a third aspect of the present invention, a terminal is provided, including: a camera, an infrared sensor, a processor, a memory, and a display apparatus; where the camera is configured to photograph an original image;

the infrared sensor is configured to: when the camera photographs the original image, collect an ambient infrared ray and obtain ambient infrared intensity I;

the memory is configured to store a preset correspondence between tested infrared intensity and infrared image data;

the processor is configured to:

obtain image data of the photographed original image, and obtain the ambient infrared intensity I that is used when the original image is photographed;

obtain infrared image data corresponding to I according to the preset correspondence between tested infrared intensity and infrared image data;

obtain corrected image data according to the image data of the original image and the infrared image data corresponding to I; and obtain a corresponding corrected image according to the corrected image data, and output the corrected image to the display apparatus; and the display apparatus is configured to display the corrected image.

With reference to the third aspect, in a first possible implementation manner, the correspondence is a relationship set including n groups of tested infrared intensity $I_x$ and infrared image data $M_x$; the infrared image data $M_x$ is infrared image data obtained when the tested infrared intensity $I_x$ participates in imaging, where a value of x is 1, 2, ..., n−1, n, and n is a positive integer greater than 1;

the processor is specifically configured to determine, from the correspondence, that I is between $I_m$ and $I_{m+1}$, where m is a positive integer less than n; and determine, according to a preset selection policy, $M_m$ corresponding to $I_m$ or $M_{m+1}$ corresponding to $I_{m+1}$ as the infrared image data corresponding to I.

With reference to the first possible implementation manner of the third aspect, in a second possible implementation manner, the processor is specifically configured to determine, according to a preset policy of selecting a lower limit, $M_m$ corresponding to $I_m$ as the infrared image data corresponding to I.

With reference to the first possible implementation manner of the third aspect, in a third possible implementation manner, the processor is specifically configured to: according to a proximity selection policy, determine $M_m$ corresponding to $I_m$ as the infrared image data corresponding to I if a difference between I and $I_m$ is less than or equal to a difference between $I_{m+1}$ and I; or determine $M_{m+1}$ corresponding to $I_{m+1}$ as the infrared image data corresponding to I if a difference between I and $I_m$ is greater than a difference between $I_{m+1}$ and I.

With reference to the third aspect or any one of the first to the third possible implementation manners of the third aspect, in a fourth possible implementation manner, the processor is specifically configured to obtain the corrected image data by subtracting the infrared image data corresponding to I from the image data of the original image.

With reference to the third aspect or any one of the first to the third possible implementation manners of the third aspect, in a fifth possible implementation manner, the processor is further configured to: after the corresponding corrected image is obtained according to the corrected image data, perform white balance processing on the corrected image, where the white balance means that a proportion of three primary colors is adjusted in different color temperature environments to achieve color balance.

It can be learned from the foregoing technical solutions that, according to the embodiments of the present invention, image data of a photographed original image is obtained and ambient infrared intensity I that is used when the original image is photographed is obtained; infrared image data corresponding to I is obtained according to a preset correspondence between tested infrared intensity and infrared image data; corrected image data is obtained according to the image data of the original image and the infrared image data corresponding to I, so as to eliminate impact of an infrared ray on the photographed original image; and a corrected image is obtained according to the corrected image data and the corrected image is output, thereby eliminating impact of ambient infrared intensity on quality of a photographed image. Compared with the prior art in which brightness of an obtained image is not uniform due to impact of an infrared ray, according to the image processing method provided in the embodiments of the present invention, impact of an infrared ray on image quality may be reduced by means of image processing, so as to obtain an image with uniform brightness.

DESCRIPTION OF EMBODIMENTS

The following clearly and completely describes the technical solutions in the embodiments of the present invention with reference to the accompanying drawings in the embodiments of the present invention. The described embodiments are merely some but not all of the embodiments of the present invention. All other embodiments obtained by persons skilled in the art based on the embodiments of the present invention without creative efforts shall fall within the protection scope of the present invention.

Figure 1:
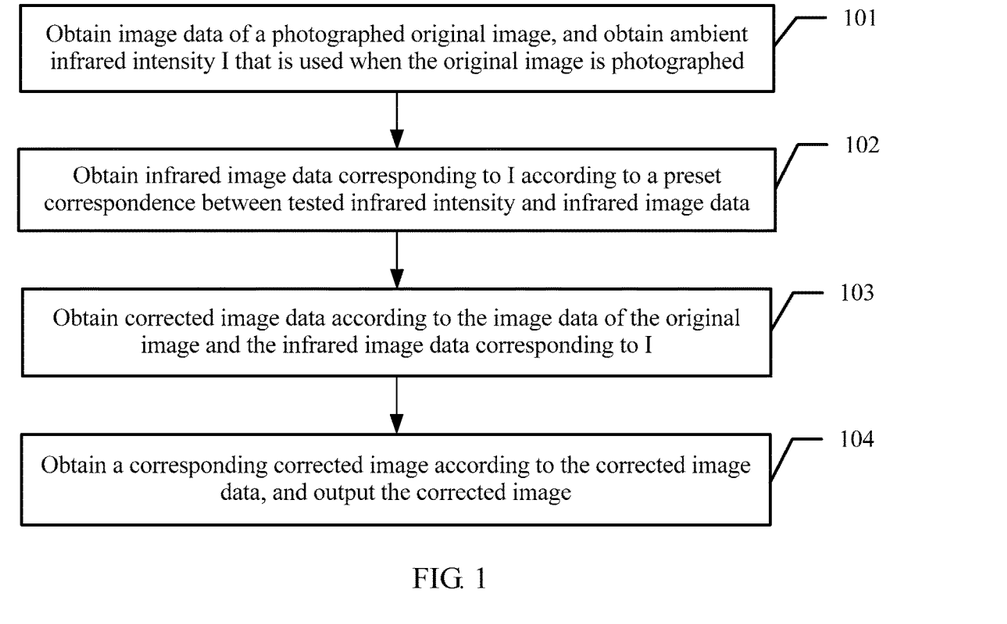
FIG. 1 is a schematic diagram of an embodiment of an image processing method according to an embodiment of the present invention.

Referring to FIG. 1, an embodiment of an image processing method according to an embodiment of the present invention includes:

101. Obtain image data of a photographed original image, and obtain ambient infrared intensity I that is used when the original image is photographed.

When photographing an image, a terminal converts an optical image generated from a photographed object into an electrical signal, and the electrical signal is then converted into a digital signal by means of analog-to-digital (A/D) conversion, so as to obtain the image data of the original image. Meanwhile, an apparatus such as an infrared sensor measures the ambient infrared intensity I that is used when the original image is photographed.

102. Obtain infrared image data corresponding to I according to a preset correspondence between tested infrared intensity and infrared image data.

The correspondence between tested infrared intensity and infrared image data may be a set of mapping relationships between tested infrared intensity and infrared image data. The tested infrared intensity in the set gradiently changes, for example, gradiently increases or decreases. The infrared image data in the set is infrared image data that is obtained separately when respective tested infrared intensity in the set participates in imaging, and that is corresponding to the respective tested infrared intensity.

The correspondence between tested infrared intensity and infrared image data is obtained by development personnel in advance by using a large quantity of tests. A specific test process may be:

In a laboratory, a test is performed on a terminal equipped with an infrared sensor by using an infrared generator in a dark room. The infrared generator is adjusted according to intensity of an emitted infrared ray from weak to strong. Intensity of a tested infrared ray emitted by the infrared generator for the first time is I1, and infrared image data obtained by the terminal by means of infrared exposure and optical-to-electrical conversion is M1. Certainly, I1 may be 0, or may be very small intensity of a tested infrared ray. The infrared generator is adjusted, and when the tested infrared intensity is I2, infrared image data M2 is obtained. The tested infrared intensity is progressively adjusted to obtain n groups of correspondences between tested infrared intensity Ix and infrared intensity data Mx. A value of x is 1, . . . , n. A correspondence between Ix and Mx may be understood by referring to Table 1.

TABLE 1

| A correspondence between tested infrared intensity and infrared image data | |
|---|---|
| Tested infrared intensity $I_x$ | Infrared image data $M_x$ |
| $I_1$ | $M_1$ |
| $I_2$ | $M_2$ |
| ... | ... |
| $I_n$ | $M_n$ |

The correspondence between tested infrared intensity and infrared image data is not limited to the form of the foregoing Table 1. Another form may be used to express the correspondence between tested infrared intensity and infrared image data. For example, the infrared intensity may change from strong to weak to obtain corresponding infrared image data.

$M_1, \ldots, M_n$ may be data of a matrix form.

The correspondence between tested infrared intensity and infrared image data obtained after a large quantity of tests is preset in the terminal. Therefore, when an image is photographed, the correspondence between tested infrared intensity and infrared image data may be used to determine infrared image data corresponding to ambient infrared intensity I that is used when the image is photographed.

103. Obtain corrected image data according to the image data of the original image and the infrared image data corresponding to I.

The infrared image data is a factor that affects image quality. The corrected image data may be obtained by eliminating the factor that affects image quality from the image data of the original image.

Specifically, correction of the image data may be implemented by using a mathematic operation between the image data of the original image and the infrared image data corresponding to I.

104. Obtain a corresponding corrected image according to the corrected image data, and output the corrected image.

The corrected image data is output to a digital signal processor for processing, so as to be converted into an image signal of a standard format such as GRB or YUV, that is, a corrected image corresponding to the original image is obtained. Then the corrected image is output to a display terminal for display.

According to this embodiment of the present invention, image data of a photographed original image is obtained and ambient infrared intensity I that is used when the original image is photographed is obtained; infrared image data corresponding to I is obtained according to a preset correspondence between tested infrared intensity and infrared image data; corrected image data is obtained according to the image data of the original image and the infrared image data corresponding to I, so as to eliminate impact of an infrared ray on the photographed original image; and a corrected image is obtained according to the corrected image data and the corrected image is output, thereby eliminating impact of ambient infrared intensity on quality of a photographed image. Compared with the prior art in which brightness of an obtained image is not uniform due to impact of an infrared ray, according to the image processing method provided in this embodiment of the present invention, impact of an infrared ray on image quality may be reduced by means of image processing, so as to obtain an image with uniform brightness.

In the foregoing embodiment, the infrared image data corresponding to I is obtained according to the preset correspondence between tested infrared intensity and infrared image data. In a practical application, the correspondence may be in a similar form of an array, a matrix, or the like, which is not specifically limited in this specification. In addition, the corrected image data is obtained according to the image data of the original image and the infrared image data corresponding to I; the corrected image data may be obtained by computing the image data of the original image and the infrared image data corresponding to I, or another implementation manner may be used, which is not specifically limited in this specification.

Optionally, on the basis of the foregoing embodiment corresponding to FIG. 1, in a first optional embodiment of the image processing method according to this embodiment of the present invention, the correspondence is a relationship set including n groups of tested infrared intensity $I_x$ and infrared image data $M_x$; the infrared image data $M_x$ is infrared image data obtained when the tested infrared intensity $I_x$ participates in imaging, where a value of x is 1, 2, . . . , n−1, n, and n is a positive integer greater than 1.

The obtaining infrared image data corresponding to I according to a preset correspondence between tested infrared intensity and infrared image data may include:

determining, from the correspondence, that I is between $I_m$ and $I_{m+1}$, where m is less than or equal to n, and m is greater than or equal to 0; and determining, according to a preset selection policy, $M_m$ corresponding to $I_m$ or $M_{m+1}$ corresponding to $I_{m+1}$ as the infrared image data corresponding to I.

In this embodiment of the present invention, reference may be made to Table 1 for understanding. It may be determined, according to a magnitude of infrared intensity in Table 1, that the ambient infrared intensity I that is used when the image is photographed is between $I_m$ and $I_{m+1}$. For example, when m is 1, it may be determined that I is between $I_1$ and $I_2$, and in this case, $M_1$ or $M_2$ may be selected as the infrared image data corresponding to I.

Optionally, on the basis of the first optional embodiment of the foregoing image processing method, in a second optional embodiment of the image processing method according to this embodiment of the present invention, the determining, according to a preset selection policy, $M_m$ corresponding to $I_m$ or $M_{m+1}$ corresponding to $I_{m+1}$ as the infrared image data corresponding to I may include:

determining, according to a preset policy of selecting a lower limit, $M_m$ corresponding to $I_m$ as the infrared image data corresponding to I.

In this embodiment of the present invention, when it is considered that I is between $I_m$ and $I_{m+1}$, $M_m$ is selected as the infrared image data corresponding to I. Although $M_m$ may be less than real infrared image data corresponding to I, an image with uniform brightness is still obtained even if slight impact of an infrared ray on the image data remains.

Optionally, on the basis of the first optional embodiment of the foregoing image processing method, in a third optional embodiment of the image processing method according to this embodiment of the present invention, the determining, according to a preset selection policy, $M_m$ corresponding to $I_m$ or $M_{m+1}$ corresponding to $I_{m+1}$ as the infrared image data corresponding to I may include:

according to a proximity selection policy, determining $M_m$ corresponding to $I_m$ as the infrared image data corresponding to I if a difference between I and $I_m$ is less than or equal to a difference between $I_{m+1}$ and I; or determining $M_{m+1}$ corresponding to $I_{m+1}$ as the infrared image data corresponding to I if a difference between I and $I_m$ is greater than a difference between $I_{m+1}$ and I.

In this embodiment of the present invention, $M_m$ or $M_{m+1}$ that is close to a value of I is selected as the infrared image data corresponding to I, so that an image effect obtained after correction is nearest to an image without suffering from an infrared ray.

Optionally, on the basis of the foregoing embodiment or any optional embodiment of the image processing method, in a fourth optional embodiment of the image processing method according to this embodiment of the present invention, the obtaining corrected image data according to the image data of the original image and the infrared image data corresponding to I may include:

obtaining the corrected image data by subtracting the infrared image data corresponding to I from the image data of the original image.

In this embodiment of the present invention, the image data of the original image is expressed by $M_a$, the infrared image data corresponding to I is expressed by $M_m$, and the corrected image data is expressed by $M_r$. In this case, the foregoing equation relationship may be expressed as: $M_r = M_a - M_m$.

In fact, both $M_a$ and $M_m$ are a matrix, which is typically a 17*13 matrix; the foregoing equation is matrix subtraction and $M_r$ is also a matrix.

Optionally, on the basis of the foregoing embodiment or any optional embodiment of the image processing method, in a fifth optional embodiment of the image processing method according to this embodiment of the present invention, after the obtaining a corresponding corrected image according to the corrected image data, the method may further include:

performing white balance processing on the corrected image, where the white balance means that a proportion of three primary colors is adjusted in different color temperature environments to achieve color balance.

In this embodiment of the present invention, the corrected image data is output to a digital signal processor for processing, so as to be converted into an image signal of a standard format such as GRB or YUV.

White balance means that a proportion of three primary colors is adjusted in different color temperature environments to achieve color balance, so that an image is converged to an RGB correction parameter under a related light source to achieve an effect of no color bias and correct a difference in photographing effect due to a difference of a lens parameter. The image after white balance processing is output to a display terminal for display.

Figure 2:
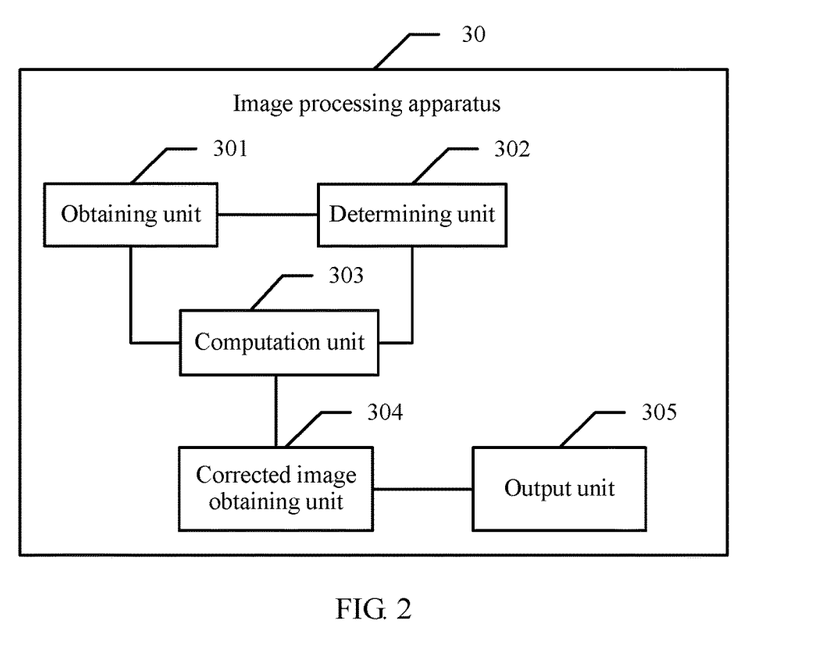
FIG. 2 is a schematic diagram of an embodiment of an image processing apparatus according to an embodiment of the present invention.

The following describes an embodiment of an image processing apparatus according to an embodiment of the present invention. The apparatus is applied to the image processing field. Referring to FIG. 2, this embodiment of the present invention includes:

an obtaining unit 301, configured to obtain image data of a photographed original image, and obtain ambient infrared intensity I that is used when the original image is photographed;

a determining unit 302, configured to obtain, according to a preset correspondence between tested infrared intensity and infrared image data, infrared image data corresponding to I that is obtained by the obtaining unit 301;

a computation unit 303, configured to obtain corrected image data according to the image data of the original image obtained by the obtaining unit 301 and the infrared image data corresponding to I determined by the determining unit 302;

a corrected image obtaining unit 304, configured to obtain a corresponding corrected image according to the corrected image data obtained by the computation unit 303; and an output unit 305, configured to output the corrected image obtained by the corrected image obtaining unit 304.

According to this embodiment of present invention, an obtaining unit 301 obtains image data of a photographed original image, and obtains ambient infrared intensity I that is used when the original image is photographed; a determining unit 302 obtains, according to a preset correspondence between tested infrared intensity and infrared image data, infrared image data corresponding to I obtained by the obtaining unit 301; a computation unit 303 obtains corrected image data according to the image data of the original image obtained by the obtaining unit 301 and the infrared image data corresponding to I determined by the determining unit 302; a corrected image obtaining unit 304 obtains a corresponding corrected image according to the corrected image data obtained by the computation unit 303; and an output unit 305 outputs the corrected image obtained by the corrected image obtaining unit 304. Compared with the prior art in which brightness of an obtained image is not uniform due to impact of an infrared ray, according to the image processing apparatus provided in this embodiment of the present invention, impact of an infrared ray on image quality may be reduced by means of image processing, so as to obtain an image with uniform brightness.

Figure 3:
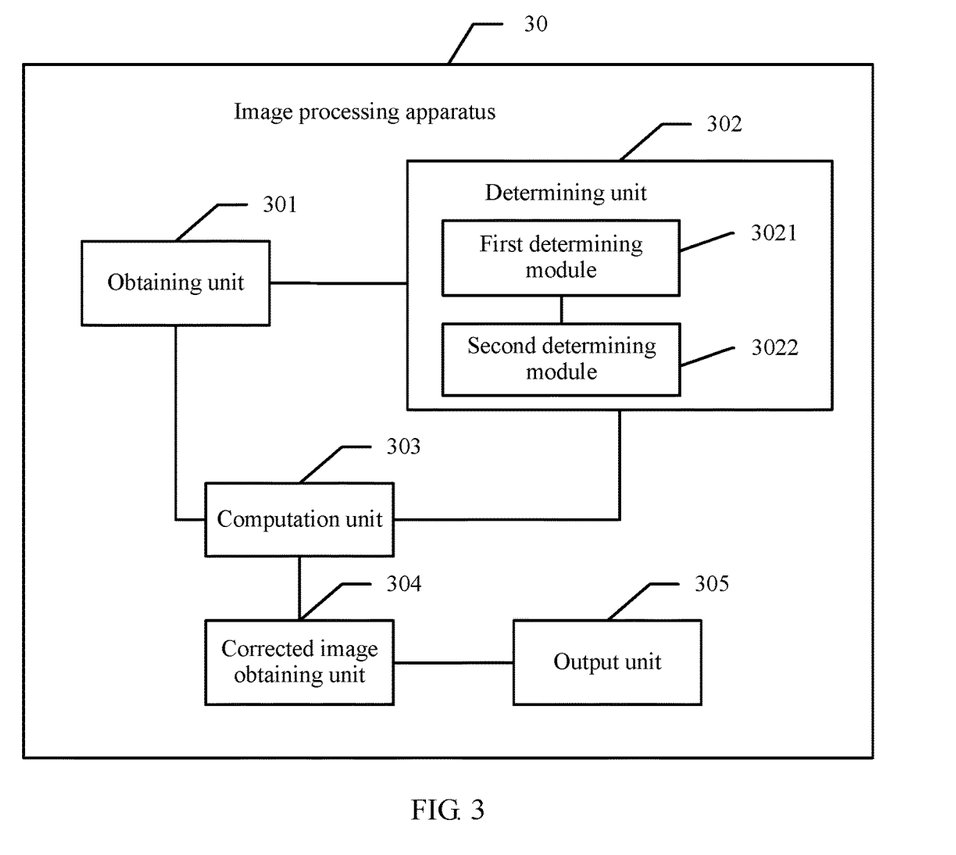
FIG. 3 is a schematic diagram of another embodiment of an image processing apparatus according to an embodiment of the present invention.

Optionally, on the basis of the foregoing embodiment corresponding to FIG. 2, referring to FIG. 3, in a first optional embodiment of the image processing apparatus according to this embodiment of the present invention, the determining unit 302 includes:

a first determining module 3021, configured to determine, from the correspondence, that I is between $I_m$ and $I_{m+1}$, and where the correspondence is a relationship set including n groups of tested infrared intensity $I_x$ and infrared image data $M_x$; the infrared image data $M_x$ is infrared image data obtained when the tested infrared intensity $I_x$ participates in imaging, a value of x is 1, 2, . . . , n−1, n, and n is a positive integer greater than 1; and m is a positive integer less than n; and a second determining module 3022, configured to determine, according to a preset selection policy, $M_m$ corresponding to $I_m$ or $M_{m+1}$ corresponding to $I_{m+1}$ as the infrared image data corresponding to I, where $I_m$ and $I_{m+1}$ are determined by the first determining module 3021.

Optionally, on the basis of the foregoing embodiment corresponding to FIG. 3, in a second optional embodiment of the image processing apparatus according to this embodiment of the present invention, the second determining module 3022 is specifically configured to determine, according to a preset policy of selecting a lower limit, $M_m$ corresponding to $I_m$ as the infrared image data corresponding to I.

Optionally, on the basis of the foregoing embodiment corresponding to FIG. 3, in a third optional embodiment of the image processing apparatus according to this embodiment of the present invention, the second determining module 3022 is specifically configured to: according to a proximity selection policy, determine $M_m$ corresponding to $I_m$ as the infrared image data corresponding to I if a difference between I and $I_m$ is less than or equal to a difference between $I_{m+1}$ and I; or determine $M_{m+1}$ to corresponding to $I_{m+1}$ as the infrared image data corresponding to I if a difference between I and $I_m$ is greater than a difference between $I_{m+1}$ and I.

Optionally, on the basis of the foregoing embodiment, the first, the second, or the third optional embodiment of the image processing apparatus, in a fourth optional embodiment of the image processing apparatus according to this embodiment of the present invention, the computation unit 303 is specifically configured to obtain the corrected image data by subtracting the infrared image data corresponding to I from the image data of the original image.

Figure 4:
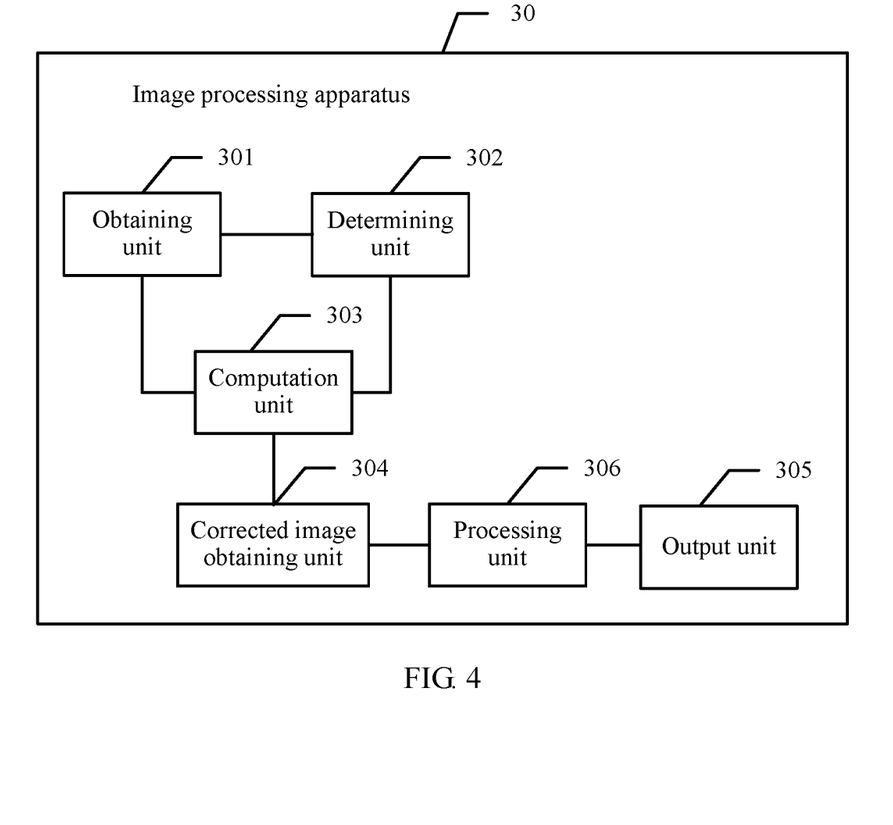
FIG. 4 is a schematic diagram of another embodiment of an image processing apparatus according to an embodiment of the present invention.

Optionally, on the basis of the foregoing embodiment, the first, the second, or the third optional embodiment of the image processing apparatus, referring to FIG. 4, in a fourth optional embodiment of the image processing apparatus according to this embodiment of the present invention, the apparatus 30 further includes:

a processing unit 306, configured to perform white balance processing on the corrected image obtained by the corrected image obtaining unit 304, where the white balance means that a proportion of three primary colors is adjusted in different color temperature environments to achieve color balance.

Figure 5:
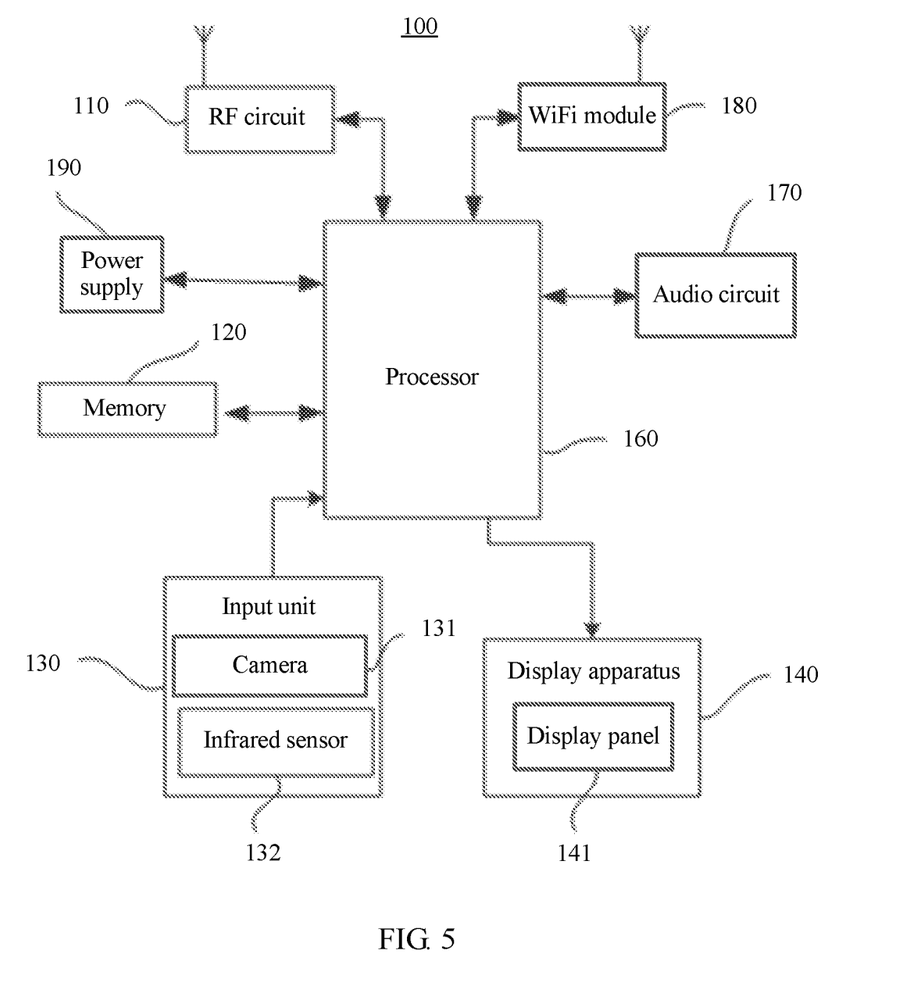
FIG. 5 is a schematic diagram of an embodiment of a terminal according to an embodiment of the present invention.

Referring to FIG. 5, in this embodiment, a terminal is used as an example to describe the present invention in detail.

It should be understood that the shown terminal is merely an example of a mobile terminal such as a mobile phone, and the terminal may have more or less parts than that shown in the figure, and may combine two or more parts or may have different part configurations. Various parts shown in the figure may be implemented in hardware including one or more signal processing and/or application-specific integrated circuits, software or a combination of hardware and software.

Now a terminal is used as an example to provide a detailed description. FIG. 5 is a schematic structural diagram of an embodiment of a terminal used for image processing according to the present invention. As shown in FIG. 5, the terminal includes a processor 160, a memory 120, a radio frequency (RF) circuit 110, a power supply 190, an input unit 130, a display apparatus 140, an audio circuit 170, and a WiFi module 180, where the input unit 130 includes a camera 131 and an infrared sensor 132, and these parts communicate with each other by using one or more communications buses or signal lines.

It should be noted that, the terminal provided in this embodiment is merely an example of a mobile terminal. The mobile terminal involved in this embodiment of the present invention may have more or less parts than that shown in FIG. 5, may combine two or more parts, or may have different part configurations or settings. Each part may be implemented in hardware including one or more signal processing and/or application-specific integrated circuits, software or a combination of hardware and software.

The following describes the terminal for processing an image according to this embodiment in detail.

The camera 131 is configured to photograph an original image.

The infrared sensor 132 is configured to: when the camera photographs the original image, collect an ambient infrared ray and obtain ambient infrared intensity I.

The memory 120 is configured to store a preset correspondence between tested infrared intensity and infrared image data.

The memory 120 may be one or more disk storage components, flash memory components, or other volatile solid-state storage components.

The radio frequency circuit 110 is mainly configured to establish communication between a terminal and a wireless network (that is, a network side), to implement data receiving and sending between the terminal and the wireless network, for example, receiving and sending of an SMS message, an email, and the like. Specifically, the radio frequency circuit 205 receives and sends a radio frequency signal, which is also referred to as an electromagnetic signal; the radio frequency circuit 205 converts an electrical signal into an electromagnetic signal or converts an electromagnetic signal into an electrical signal, and communicates with a communications network and another device by using the electromagnetic signal. The radio frequency circuit 110 may include a known circuit that is configured to execute these functions, which includes but is not limited to an antenna system, a radio frequency transceiver, one or more amplifiers, a tuner, one or more oscillators, a digital signal processor, a CODEC chipset, a subscriber identity module (SIM), and the like.

The audio circuit 170 is mainly configured to convert the audio data into an electrical signal.

The power supply 190 is configured to supply power to all parts in the terminal.

The processor 160 may be an integrated circuit chip having a signal processing capability. In an implementation process, all steps of the foregoing method may be performed by an integrated logic circuit in hardware in the processor 160 or an instruction in the form of software. The foregoing processor 160 may be a general purpose processor, a digital signal processor (DSP), an application-specific integrated circuit (ASIC), a field programmable gate array (FPGA) or another programmable logic device, a discrete gate or transistor logic device, or a discrete hardware component, which can implement or perform methods, steps, and logical block diagrams disclosed in the embodiments of the present invention. The general purpose processor may be a microprocessor or the processor may be any conventional processor or the like.

It can be understood that, according to this embodiment of the present invention, the processor 160 may perform image processing in a manner as described in the previous embodiment.

The processor 160 is configured to:

obtain image data of the photographed original image, and obtain the ambient infrared intensity I that is used when the original image is photographed;

obtain infrared image data corresponding to I according to the preset correspondence between tested infrared intensity and infrared image data;

obtain corrected image data according to the image data of the original image and the infrared image data corresponding to I; and obtain a corresponding corrected image according to the corrected image data, and output the corrected image to the display apparatus.

The display apparatus 140 is configured to display the corrected image.

According to the terminal provided in this embodiment of the present invention, impact of an infrared ray on image quality may be reduced by means of image processing, so as to obtain an image with uniform brightness.

Optionally, the correspondence is a relationship set including n groups of tested infrared intensity $I_x$ and infrared image data $M_x$; the infrared image data $M_x$ is infrared image data obtained when the tested infrared intensity $I_x$ participates in imaging, where a value of x is 1, 2, ..., n−1, n, and n is a positive integer greater than 1.

The processor 160 is specifically configured to: determine, from the correspondence, that I is between $I_m$ and $I_{m+1}$, where m is less than or equal to n, and m is greater than or equal to 0; and determine, according to a preset selection policy, $M_m$ corresponding to $I_m$ or $M_{m+1}$ corresponding to $I_{m+1}$ as the infrared image data corresponding to I.

Optionally, the processor 160 is specifically configured to determine, according to a preset policy of selecting a lower limit, $M_m$ corresponding to $I_m$ as the infrared image data corresponding to I.

Optionally, the processor 160 is specifically configured to: according to a proximity selection policy, determine $M_m$ corresponding to $I_m$ as the infrared image data corresponding to I if a difference between I and $I_m$ is less than or equal to a difference between $I_{m+1}$ and I; or determine $M_{m+1}$ corresponding to $I_{m+1}$ as the infrared image data corresponding to I if a difference between I and $I_m$ is greater than a difference between $I_{m+1}$ and I.

Optionally, the processor 160 is specifically configured to obtain the corrected image data by subtracting the infrared image data corresponding to I from the image data of the original image.

Optionally, the processor 160 is further configured to perform white balance processing on the corrected image, where the white balance means that a proportion of three primary colors is adjusted in different color temperature environments to achieve color balance.

In the foregoing embodiments, the mobile terminal includes but is not limited to a mobile communications device such as a terminal, a personal digital assistant (PDA) or a tablet computer.

It needs to be noted that persons of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The storage medium may be a magnetic disk, an optical disc, a read-only memory, a random access memory, or the like.

The foregoing describes in detail the image processing method and apparatus provided in the present invention. Specific embodiments are used in this specification to describe the principle and implementation manners of the present invention. The foregoing embodiments are merely intended to help understand the method and idea of the present invention. In addition, with respect to the implementation manners and the application scope, modifications may be made by persons of ordinary skill in the art according to the idea of the present invention. Therefore, the specification shall not be construed as a limitation on the present invention. The terms used in the embodiments of the present invention are merely for the purpose of illustrating specific embodiments, and are not intended to limit the present invention. The terms "a", "said" and "the" of singular forms used in the embodiments and the appended claims of the present invention are also intended to include plural forms, unless otherwise specified in the context clearly. It should also be understood that, the term "and/or" used herein indicates and includes any or all possible combinations of one or more associated listed items.

It may be clearly understood by persons skilled in the art that, for the purpose of convenient and brief description, for a detailed working process of the foregoing apparatus and unit, reference may be made to a corresponding process in the foregoing method embodiments, and details are not described herein.

In the several embodiments provided in the present application, it should be understood that the disclosed apparatus and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present invention. The foregoing storage medium includes: any medium that can store program code, such as a Universal Serial Bus (USB) flash drive, a removable hard disk, a read-only memory (ROM), a random access memory (RAM), a magnetic disk, or an optical disc.

The foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention. Additionally, statements made herein characterizing the invention refer to an embodiment of the invention and not necessarily all embodiments.

What is claimed is:

1. An image processing method, comprising:
   photographing, by a terminal, an original image;
   obtaining, by the terminal, image data of the original image and a measured ambient infrared intensity I corresponding to the original image;
   removing, by the terminal, effects of ambient infrared light on the original image, wherein removing the effects of ambient infrared light on the original image comprises:
      obtaining infrared image data which corresponds to the measured ambient infrared intensity I according to a pre-tested correspondence between tested infrared intensities and respective infrared image data;
      obtaining corrected image data according to the image data of the original image and the infrared image data corresponding to the measured ambient infrared intensity I; and
      obtaining a corrected image according to the corrected image data; and
   outputting, by the terminal, the corrected image;
   wherein the pre-tested correspondence is a relationship set comprising n groups of tested infrared intensities $I_x$, and infrared image data $M_x$, wherein n is a positive integer greater than 1;
   wherein the infrared image data $M_x$ is infrared image data obtained corresponding to the tested infrared intensities $I_x$ for integer values of x from 1 to n;
   wherein obtaining the infrared image data which corresponds to the measured ambient infrared intensity I according to the pre-tested correspondence comprises:
      determining, from the pre-tested correspondence, that the measured ambient infrared intensity I is between a tested infrared intensity $I_m$ and a tested infrared intensity $I_{m+1}$, wherein m is a positive integer less than n; and
      determining, according to a preset selection policy, infrared image data $M_m$ corresponding to the tested infrared intensity $I_m$ or infrared image data $M_{m+1}$ corresponding to the tested infrared intensity $I_{m+1}$ as the infrared image data corresponding to the measured ambient infrared intensity I.

2. The method according to claim 1, wherein determining, according to the preset selection policy, the infrared image data $M_m$ corresponding to the tested infrared intensity $I_m$ or the infrared image data $M_{m+1}$ corresponding to the tested infrared intensity $I_{m+1}$ as the infrared image data corresponding to the measured ambient infrared intensity I comprises:
   determining, according to a preset policy of selecting a lower limit, the infrared image data $M_m$ corresponding to the tested infrared intensity $I_m$ as the infrared image data corresponding to the measured ambient infrared intensity I.

3. The method according to claim 1, wherein determining, according to the preset selection policy, the infrared image data $M_m$ corresponding to the tested infrared intensity $I_m$ or the infrared image data $M_{m+1}$ corresponding to the tested infrared intensity $I_{m+1}$ as the infrared image data corresponding to the measured ambient infrared intensity I comprises:
   according to a proximity selection policy:
      determining the infrared image data $M_m$ corresponding to the tested infrared intensity $I_m$ as the infrared image data corresponding to the measured ambient infrared intensity I if a difference between the measured ambient infrared intensity I and the tested infrared intensity $I_m$ is less than or equal to a difference between the tested infrared intensity $I_{m+1}$ and the measured ambient infrared intensity I; or determining the infrared image data $M_{m+1}$ corresponding to the tested infrared intensity $I_{m+1}$ as the infrared image data corresponding to the measured ambient infrared intensity I if a difference between the measured ambient infrared intensity I and the tested infrared intensity $I_m$ is greater than a difference between the tested infrared intensity $I_{m+1}$ and the measured ambient infrared intensity I.

4. The method according to claim 1, wherein obtaining the corrected image data according to the image data of the original image and the infrared image data corresponding to the measured ambient infrared intensity I comprises:

obtaining the corrected image data by subtracting the infrared image data corresponding to the measured ambient infrared intensity I from the image data of the original image.

5. The method according to claim 1, wherein after obtaining the corrected image according to the corrected image data, the method further comprises:

performing, by the terminal, white balance processing on the corrected image, wherein the white balance processing corresponds to proportions of three primary colors being adjusted in different color temperature environments to achieve color balance.

6. A terminal, comprising:
a camera;
an infrared sensor;
a processor;
a memory; and
a display apparatus;
wherein the camera is configured to photograph an original image;
wherein the infrared sensor is configured to obtain a measured ambient infrared intensity I corresponding to the original image;
wherein the memory is configured to store a pre-tested correspondence between tested infrared intensities and respective infrared image data;
wherein the processor is configured to:
obtain image data of the photographed original image, and obtain the measured ambient infrared intensity I;
remove effects of ambient infrared light on the original image, wherein removing the effects of ambient infrared light on the original image comprises: obtaining infrared image data corresponding to the measured ambient infrared intensity I according to the pre-tested correspondence; obtaining corrected image data according to the image data of the original image and the infrared image data corresponding to the measured ambient infrared intensity I; and obtaining a corrected image according to the corrected image data; and
output the corrected image to the display apparatus;
wherein the display apparatus is configured to display the corrected image;
wherein the pre-tested correspondence is a relationship set comprising n groups of tested infrared intensities $I_x$ and infrared image data $M_x$, wherein n is a positive integer greater than 1;
wherein the infrared image data $M_x$ is infrared image data obtained corresponding to the tested infrared intensities $I_x$ for integer values of x from 1 to n;

wherein obtaining the infrared image data corresponding to the measured ambient infrared intensity I according to the pre-tested correspondence comprises:

determining, from the pre-tested correspondence, that the measured ambient infrared intensity I is between a tested infrared intensity $I_m$ and a tested infrared intensity $I_{m+1}$, wherein m is a positive integer less than n; and determining, according to a preset selection policy, infrared image data $M_m$ corresponding to the tested infrared intensity $I_m$ or infrared image data $M_{m+1}$ corresponding to the tested infrared intensity $I_{m+1}$ as the infrared image data corresponding to the measured ambient infrared intensity I.

7. The terminal according to claim 6, wherein determining, according to the preset selection policy, the infrared image data $M_m$ corresponding to the tested infrared intensity $I_m$ or the infrared image data $M_{m+1}$ corresponding to the tested infrared intensity $I_{m+1}$ as the infrared image data corresponding to the measured ambient infrared intensity I comprises:

determining, according to a preset policy of selecting a lower limit, the infrared image data $M_m$ corresponding to the tested infrared intensity $I_m$ as the infrared image data corresponding to the measured ambient infrared intensity I.

8. The terminal according to claim 6, wherein determining, according to the preset selection policy, the infrared image data $M_m$ corresponding to the tested infrared intensity $I_m$ or the infrared image data $M_{m+1}$ corresponding to the tested infrared intensity $I_{m+1}$ as the infrared image data corresponding to the measured ambient infrared intensity I comprises:

according to a proximity selection policy:
determining the infrared image data $M_m$ corresponding to the tested infrared intensity $I_m$ as the infrared image data corresponding to the measured ambient infrared intensity I if a difference between the measured ambient infrared intensity I and the tested infrared intensity $I_m$ is less than or equal to a difference between the tested infrared intensity $I_{m+1}$ and the measured ambient infrared intensity I; or determining the infrared image data $M_{m+1}$ corresponding to the tested infrared intensity $I_{m+1}$ as the infrared image data corresponding to the measured ambient infrared intensity I if a difference between the measured ambient infrared intensity I and the tested infrared intensity $I_m$ is greater than a difference between the tested infrared intensity $I_{m+1}$ and the measured ambient infrared intensity I.

9. The terminal according to claim 6, wherein obtaining the corrected image data according to the image data of the original image and the infrared image data corresponding to the measured ambient infrared intensity I comprises:

obtaining the corrected image data by subtracting the infrared image data corresponding to the measured ambient infrared intensity I from the image data of the original image.

10. The terminal according to claim 6, wherein the processor is further configured to: after the corrected image is obtained according to the corrected image data, perform white balance processing on the corrected image, wherein the white balance processing corresponds to proportions of three primary colors being adjusted in different color temperature environments to achieve color balance.

11. The method according to claim 2, wherein after obtaining the corrected image according to the corrected image data, the method further comprises:
   performing, by the terminal, white balance processing on the corrected image, wherein the white balance processing corresponds to proportions of three primary colors being adjusted in different color temperature environments to achieve color balance.

12. The method according to claim 3, wherein after obtaining the corrected image according to the corrected image data, the method further comprises:
   performing, by the terminal, white balance processing on the corrected image, wherein the white balance processing corresponds to proportions of three primary colors being adjusted in different color temperature environments to achieve color balance.

13. The terminal according to claim 7, wherein the processor is further configured to: after the corrected image is obtained according to the corrected image data, perform white balance processing on the corrected image, wherein the white balance processing corresponds to proportions of three primary colors being adjusted in different color temperature environments to achieve color balance.

14. The terminal according to claim 8, wherein the processor is further configured to: after the corrected image is obtained according to the corrected image data, perform white balance processing on the corrected image, wherein the white balance processing corresponds to proportions of three primary colors being adjusted in different color temperature environments to achieve color balance.

* * * * *